United States Patent [19]

Zimlich et al.

[11] Patent Number: 4,629,232
[45] Date of Patent: Dec. 16, 1986

[54] SPRING MOUNTED MOLDING FOR A VEHICLE

[75] Inventors: William C. Zimlich, Rochester Hills; Julius P. Fraeyman, Warren; Ronald C. Johnson, Rochester, all of Mich.

[73] Assignee: Chrysler Corporation, Highland Park, Mich.

[21] Appl. No.: 776,077

[22] Filed: Sep. 13, 1985

[51] Int. Cl.[4] ............................................. B60R 19/42
[52] U.S. Cl. .................................... 293/128; 293/135; 267/160
[58] Field of Search ............... 293/102, 135, 136, 126, 293/128, 132; 362/61, 80, 82, 83; 267/136, 139, 160

[56] References Cited

U.S. PATENT DOCUMENTS

| | | | |
|---|---|---|---|
| 2,062,328 | 12/1936 | Morrison | 293/55 |
| 2,093,734 | 9/1937 | Place | 24/253 |
| 2,174,252 | 9/1938 | Altmyer | 293/57 |
| 2,187,952 | 1/1940 | Rusche | 293/57 |
| 2,677,862 | 5/1954 | Flora | 24/73 |
| 2,691,545 | 10/1954 | Lyon | 283/62 |
| 2,820,270 | 1/1958 | Scott | 24/73 |
| 3,501,186 | 3/1970 | Wilcox et al. | 237/189.35 |
| 3,817,565 | 6/1974 | Geiger | 293/63 |
| 3,820,771 | 6/1974 | Kerr | 267/116 |
| 3,937,508 | 2/1976 | Glance et al. | 293/53 |
| 4,059,301 | 11/1977 | Meyer | 293/62 |
| 4,070,051 | 1/1978 | Peter | 362/82 X |
| 4,251,096 | 2/1981 | Stock | 293/126 X |

Primary Examiner—David A. Scherbel
Assistant Examiner—Russell D. Stormer
Attorney, Agent, or Firm—Edward A. Craig

[57] ABSTRACT

A spring mounted molding is provided for a vehicle on the body adjacent to a wrap-around end portion of the bumper. The molding and end portion of the bumper have mating cam surfaces. When the bumper moves towards the vehicle upon impact, the mating camming surfaces interact causing the molding to be deflected outwardly and the end portion of the bumper to slide therebeneath thus avoiding damage to the parts. Upon retraction of the bumper to its normal position, the spring mounting causes the molding to return to its normal position lying against the body of the vehicle.

5 Claims, 9 Drawing Figures

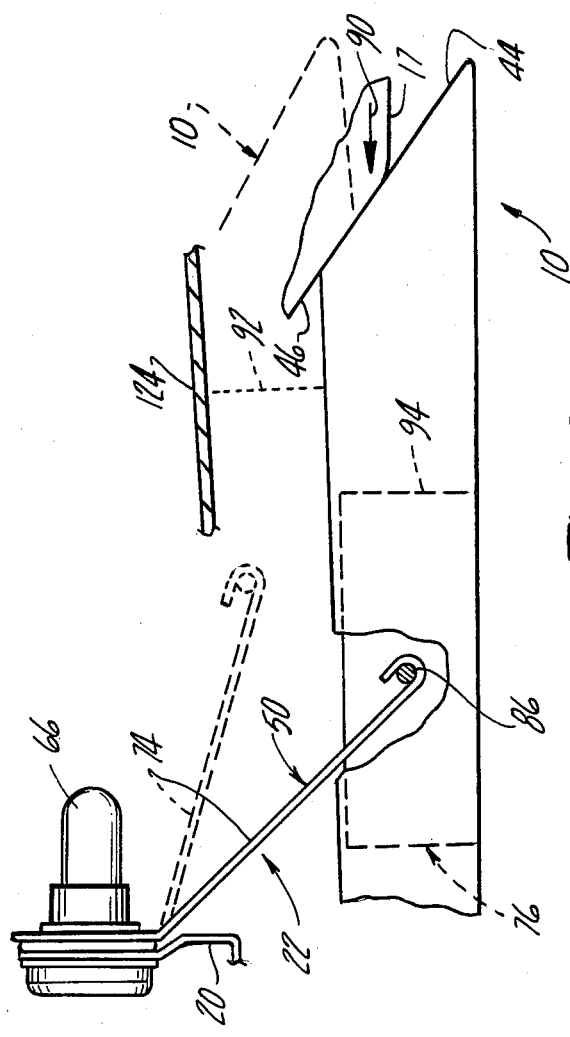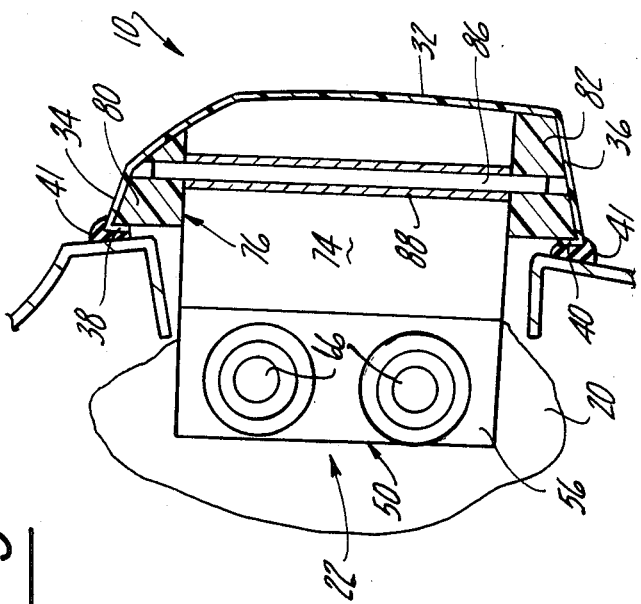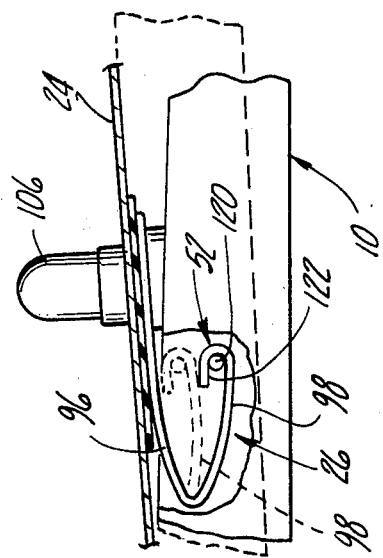

SPRING MOUNTED MOLDING FOR A VEHICLE

BACKGROUND OF THE INVENTION

Government regulations have mandated that front and rear bumpers of vehicles be so constructed and mounted as not to be damaged as a consequence of low speed impact with other vehicles or fixed structure. The prevailing method for accomplishing this has been to mount the bumper onto the vehicle by means of an energy absorbing device, such as a shock absorbing structure. When the bumper is impacted at low speeds, the energy absorbing device collapses, absorbing the energy of impact. This collapse takes with it the bumper which moves towards the vehicle. After being impacted, the energy absorbing devices bias the bumper back to its normal position.

One problem which has been encountered in connection with such structures is the maintenance of the integrity of molding typically provided on the fenders of vehicles adjacent to and in-line with wrap-around end portions of the bumpers which extend around the sides of the vehicles. As the bumper is moved toward the vehicle, the wrap-around end portions also, of course, move. These end portions will impact moldings which are mounted on the fenders closely adjacent thereto. If the moldings are rigid pieces, and rigidly mounted, they will be damaged upon impact with the end portions of the bumper.

One solution to this problem has been the use of flexible moldings. When such moldings are impacted, they deform without damage. Upon retraction of the bumper after impact, such moldings may be straightened out by hand or may return to normal positions as a consequence of inherent resiliency. Examples of such moldings are illustrated in U.S. Pat. Nos. 3,937,508 and 4,059,301.

It has been desired to use a molding fabricated of rigid material. Such a molding will not, of course, flex upon being impacted by an end portion of a bumper. It is necessary that such rigid molding not be damaged by the bumper upon impact. In accordance with these needs, spring mounting means are provided for a molding in accordance with the present invention to permit outward deflection of the molding upon bumper movement, with the end portions of the bumper sliding beneath the molding thereby avoiding damage.

SUMMARY OF THE INVENTION

A spring mounted molding for a vehicle having a body and a bumper mounted on one of the forward and rearward ends thereof is provided. Energy absorbing structure is provided to mount the bumper to the vehicle. The energy absorbing structure biases the bumper to a normal position but permits movement of the bumper toward the vehicle upon impact. The bumper has an end portion extending around a side of the vehicle body. The spring mounted molding comprises a relatively rigid element having an underside and an exterior side. Spring means are provided on the underside of the molding. The spring means are connected between the molding and vehicle with the molding lying on the exterior of the vehicle body in alignment with, and adjacent to, the bumper end portion. The spring means biases the molding closely adjacent to the vehicle body. The molding has a camming surface adjacent to the bumper end portion. The bumper end portion has a mating camming surface adapted to contact the molding camming surface and move to the underside of the molding when the bumper is moved towards the vehicle upon impact, with the molding moving away from the vehicle body against the action of the spring means. The spring means is effective to bias the molding back to its original position upon retraction of the bumper end portion.

DESCRIPTION OF THE DRAWINGS

FIG. 5 is a view illustrating the left-hand portion of the molding as viewed in FIG. 2 after it has been deflected by the front bumper;

FIG. 6 is a view of the right-hand portion of the molding as viewed in FIG. 2 after it has been deflected by the front bumper;

FIG. 7 is a sectional view taken substantially along the line 7—7 of FIG. 4 looking in the direction of the arrows;

DESCRIPTION OF THE PREFERRED EMBODIMENT

Figure 1:
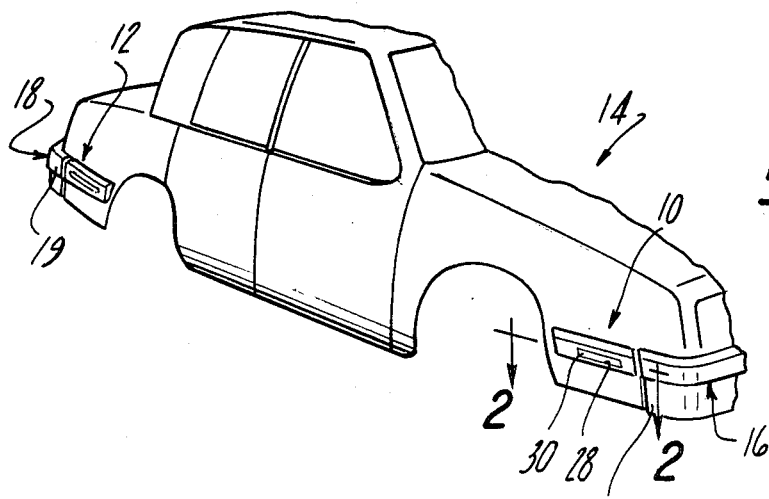
FIG. 1 is a view in perspective of a portion of a car with the spring mounted molding forming one embodiment of the present invention illustratively mounted on the righthand front and rear fenders.

Referring to FIG. 1, it will be noted that spring mounted vehicle moldings 10, 12 in accordance with the present invention are mounted on the sides of the front and rear right fenders of an automobile 14. Mirror image moldings are mounted on the opposite or left-hand side of the automobile 14. The front molding 10 and rear molding 12 have substantially the same construction and therefore only the front molding 10 will be described in detail. It will be noted that each molding is mounted in line with and adjacent to the end portions 17, 19 of front bumper element 16 and rear bumper element 18. These portions extend around the side of the vehicle.

The bumper elements are mounted on the automobile 14 for movement relative to the automobile body upon impact. Energy absorbing devices, such as shock absorbers, are provided to mount and bias the bumper elements in a normal position such, for example, as illustrated in the previously mentioned U.S. Pat. Nos. 3,937,508 and 4,059,301. The specific type of energy absorbing device is not germane to the present invention, the present invention functioning with various styles of such devices. The energy absorbing devices permit movement of the bumper a short distance towards the vehicle on which they are mounted after a low speed impact with another vehicle or stationary structure without appreciable damage to the bumper structure. After the impacting force is dissipated, the bumper structure is returned to its original position by the energy absorbing devices. Such bumper mounting constructions are common in the automotive industry at this time.

Figure 2:
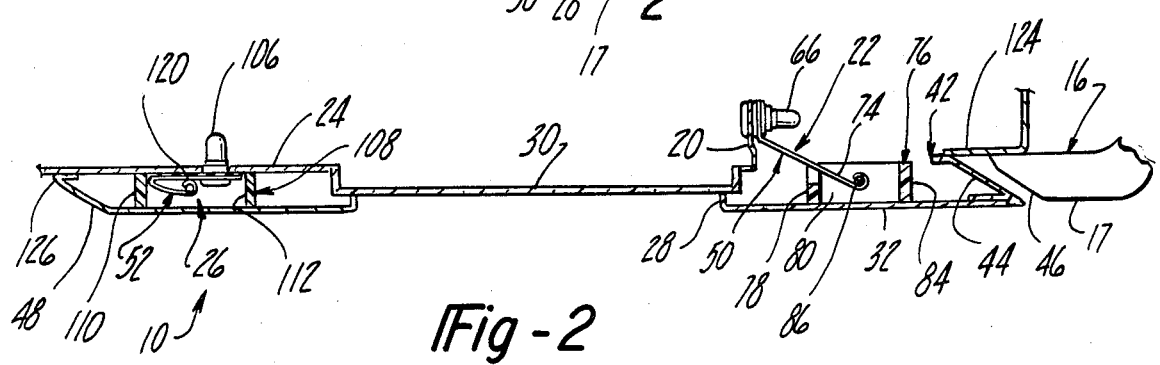
FIG. 2 is a sectional view taken substantially along the line 2—2 of FIG. 1 looking in the direction of the arrows.

The spring mounted moldings of the present invention are designed to accommodate limited bumper motion without damage to the molding. As shown in FIG. 2, the portion of the molding 10 adjacent to the front bumper element end portion 17 is mounted to body structure 20 by means of a spring mechanism 22. The portion of the molding 10 which is remote from the bumper end portion 17 is mounted to automobile body structure 24 by means of spring mechanism 26.

The molding 10 is a relatively rigid trim piece designed to stylistically merge with the front bumper element 16. The molding 10 includes a rectangular opening 28 which surrounds a lens 30, usually amber in color, which is mounted on the automobile body structure. A lamp is normally provided behind the lens to illuminate the lens when the vehicle lights are energized. Such lamps are commonly referred to as "fender marker lamps" and the molding 10 as a "marker surround".

The molding 10 may be fabricated as, for example, a stamped brass element. The molding 10 is elongated in the direction of a length of the automobile 14. It includes an exterior side comprising an outer wall portion 32 from the sides of which depend side wall portions 34, 36 which space the outer wall portion 32 from the automobile body structure. The side wall portions 34, 36 terminate in inwardly turned flange portions 38, 40, all of which may be seen in FIG. 7. As will be noted in FIG. 7, an isolation molding strip 41 is provided along the flange portions 38, 40 of the molding 10 on the underside thereof to isolate it from the surface of the automobile body. The strip 41 may be fabricated of, for example, PVC.

The end of the molding 10 adjacent to the bumper end portion 17 is provided with an end cap 42 which is staked securely in place. The end of the molding 10 remote from the bumper element 16 is closed by means of portion 48. The end cap 42 conforms to the shape of the molding 10. The cap 42 is provided with a wall portion 44 adjacent to the bumper end portion 17 which extends at an angle outwardly and towards the bumper end portion 17. The bumper end portion 17 has a similar wall surface 46 which is reversely angled. In operation, the faces of portions 44, 46 function as mating camming surfaces at such times as bumper element 16 is moved towards the molding 10 upon impact of the bumper. The camming action which results causes the molding 10 to be pivoted out of the way of the bumper end portion 17 as will be later described. As will be noted in FIG. 2, a space is provided between the wall portions 44, 46. This space accounts for a portion of the bumper stroke. Typically, the space may be about 0.750 inch.

The spring mechanisms 22 and 24 will next be described. These mechanisms may best be seen in FIGS. 2, 4, 7, 8 and 9. Each spring mechanism includes a spring clip 50, 52 which may be fabricated of spring steel. Each spring clip includes spring arm structure which may be characterized as flat spring means.

The spring mechanism 22 includes the spring clip 50 which is secured to fixed body structure 20. The spring clip 50 includes a mounting portion 56 having a pair of openings 58, 60. Similar openings 62, 64 are provided in body structure 20. Inserted through these openings are a pair of staking elements 66. Washers 70, 72 are interposed between the staking elements and body structure 20 and between body structure 20 and mounting portion 56. The spring clip 50 has a spring arm 74 which extends away from mounting portion 56 at an angle towards the molding 10. The spring arm 74 extends into the center of a rectangular carriage 76 which is received within the molding 10. The carriage 76 has an open top and bottom. One wall 78 is foreshortened to permit the presence of the spring arm 74. Side walls 80, 82 of carriage 76 are conformed to the shape of the molding 12 and are received in the portions formed by wall portions 32, 34, 36 and flanges 38, 40. This configuration defines a guideway for the carriage 76 and permits sliding movement of the carriage 76 within the molding 10. The carriage 76 is completed by an end wall 84 (FIG. 2). The carriage 76 may be fabricated of a plastic or like material.

A pin 86 extends between side walls 80, 82 of the carriage and is molded thereinto. The pin 86 is located substantially centrally of the carriage and receives bentover portion 88 of the spring arm 74 (as indicated by arrow 89 of FIG. 8) to thereby secure the spring arm to the carriage.

Figure 3:
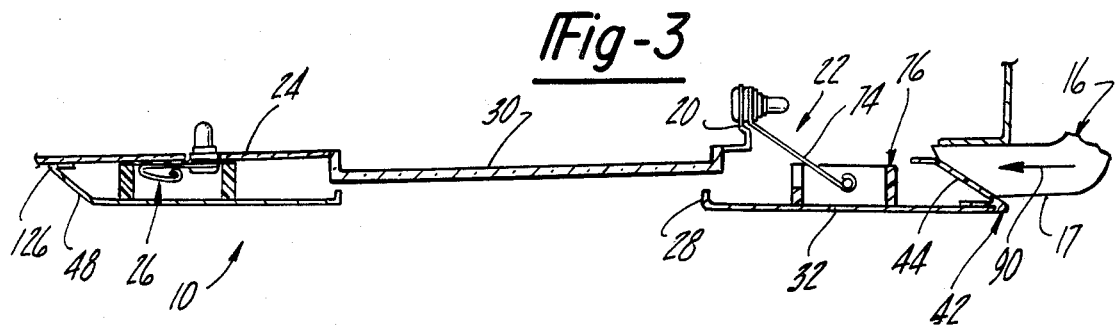
FIG. 3 is a view similar to FIG. 2 with the front bumper moved into a position where it contacts the front fender spring mounted molding.
Figure 4:
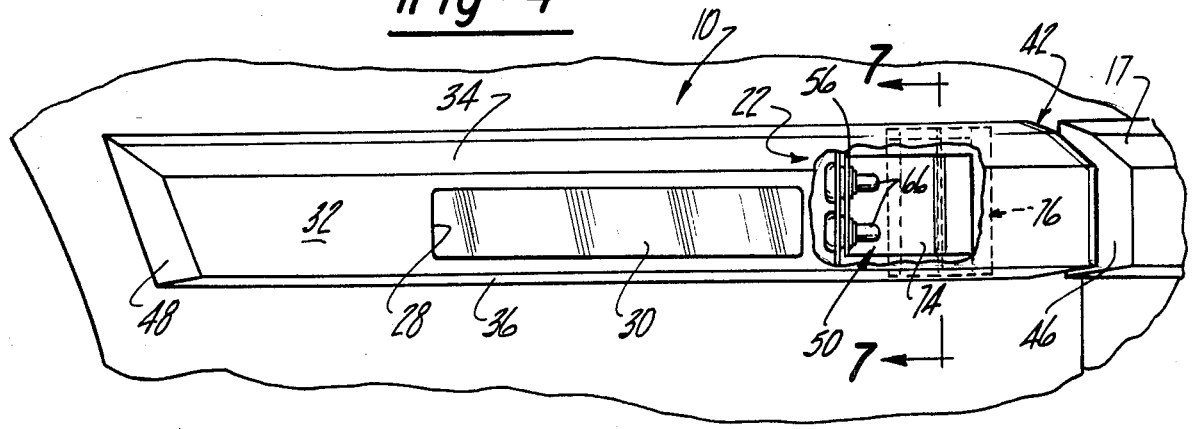
FIG. 4 is an enlarged view of the front fender spring mounted molding of FIG. 1 with portions broken away for the purpose of clarity.
Figure 8:
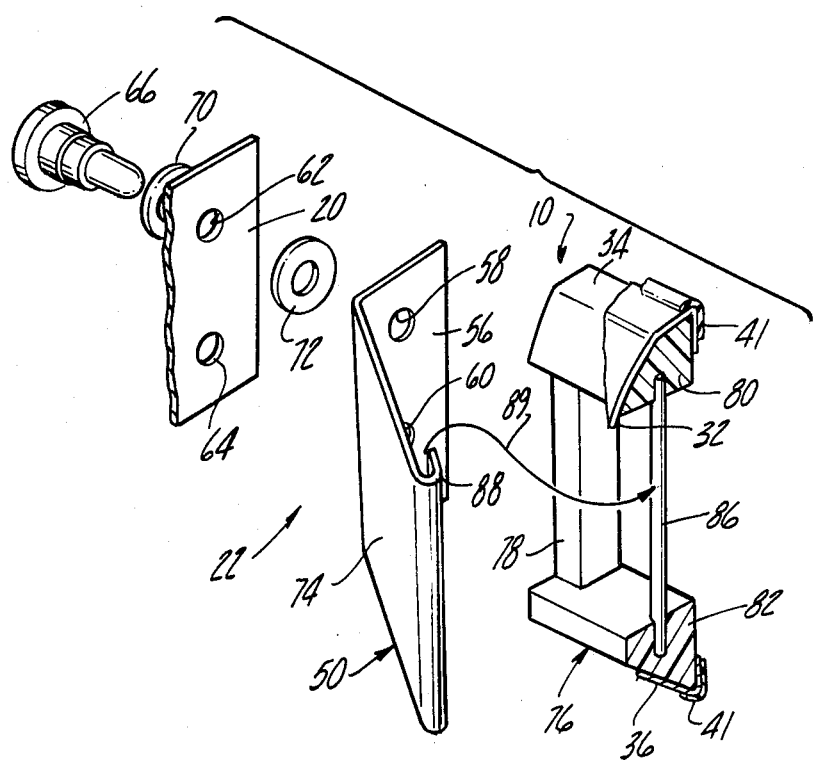
FIG. 8 is an exploded view of the spring mounting assembly for the right-hand portion of the molding as viewed in FIG. 2.

As will be appreciated outward flexing of spring arm 74 as a result of movement of the molding 10 caused by contact with bumper element 16 as it is moved in the direction of the arrow 90, as shown in FIGS. 3 and 4, will result in deflection of spring arm 74 and movement of the carriage 76 away from the bumper. Movement of the carriage 76 is illustrated by the dotted line showing 92, 94 in FIG. 6.

Figure 9:
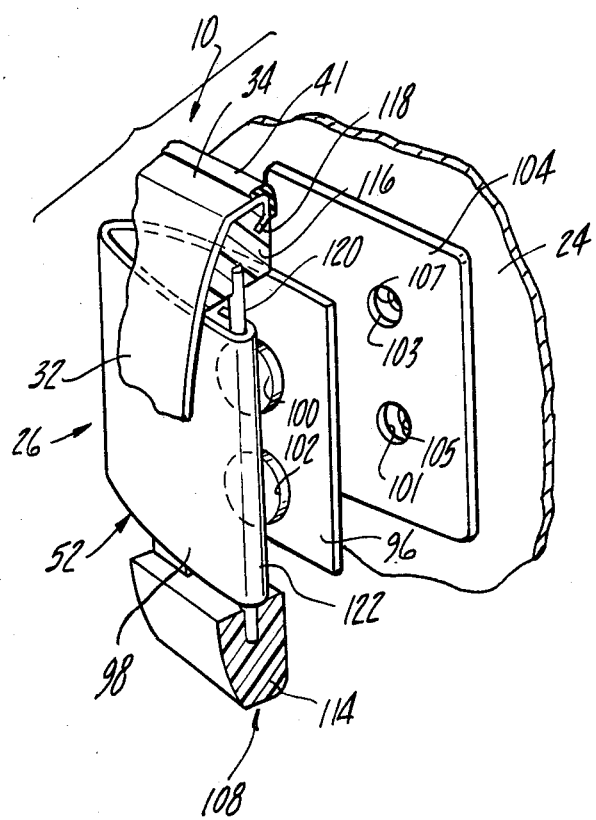
FIG. 9 is an exploded view of the spring mounting assembly for the left-hand portion of the molding as viewed in FIG. 2.

The other spring mechanism 26 is constructed similarly to the spring structure 22. The spring clip 52 is constructed of two spring arms 96, 98 having a U-shape configuration. The spring arm 96 is provided with a pair of openings 100, 102 which mate with similar openings 101, 103 provided in a gasket 104 and 105, 107 in body structure 24. Spring clip 52 is also secured in place by means of staking elements 106. A rectangular carriage 108 is provided for connection of spring clip 52 to the molding 10. The carriage 108 has end walls 110, 112 which interconnect with side walls 114, 116 (FIGS. 2 and 9). The side walls 114, 116 are configured in the shape of the molding interior portions formed by walls 32, 34, 36 and flanges 38, 40. However, carriage 108 is fixed in place and is not movable as is the carriage 76. This is accomplished by means of staking as shown at 118 in FIG. 9. A pin 120 is molded into side walls 114, 116 and receives turned-over portion 122 of spring arm 98.

In operation, the molding 10 lies against body structures 24 and 124 in its normal at-rest position as shown in FIG. 2. When bumper element 16 is moved in the direction of arrow 90, contact with end portion 17 will cause molding 10 to deflect outwardly thereby permitting passage of the bumper end portion 17 therebeneath without damage to the molding or damage to the automobile body. As the molding 10 is deflected, the portion nearest the bumper end portion 17 will swing in a fairly wide arc as shown in FIG. 6. Along with this spring arm movement, the carriage 76 slides in molding 10. Spring mechanism 26 serves to permit lesser pivoting of the end of molding 10 remote from the bumper element 16. Both spring arms 96, 98 deflect. The remote end point 126 of the molding 10 acts as a pivot center. As will be noted in FIG. 5, the pin 120 moves in what is essentially a straight line and thus it is not required that the carriage 108 be movable. It is not desired that this carriage be movable otherwise the molding 10 would slide along the surface of the body structure. When the bumper element 16 is retracted to its normal position, molding 10 is also returned to the normal position shown in FIG. 2 as a result of the spring bias.

We claim:

1. A spring mounted molding for a vehicle having a body and a bumper mounted on one of the forward and rearward ends thereof, energy absorbing structure mounting the bumper to the vehicle, said energy absorbing structure biasing the bumper to a normal position but permitting movement of the bumper towards the vehicle upon impact, said bumper having an end portion extending around a side of the vehicle body, said spring mounted molding comprising a relatively rigid element having an underside and an exterior side, spring means on the underside of the molding, said spring means being connected between the molding and the vehicle with the molding lying on the exterior of the vehicle body in alignment with, and adjacent to, said bumper end portion, said spring means biasing the molding closely adjacent to the vehicle body, the molding having a camming surface adjacent to the bumper end portion, the bumper end portion having a mating camming surface adapted to contact the molding camming surface and move to the underside of the molding when the bumper is moved towards the vehicle upon impact, with said molding moving away from the vehicle body against the action of said spring means, said spring means being effective to bias the molding back to its original position upon retraction of the bumper end portion; said spring means being fixedly anchored to one of the vehicle and molding and slidably anchored to the other of the vehicle and molding, said spring means comprising a pair of spring mechanisms, one of said spring mechanisms being positioned remotely from said bumper end portion and being fixedly anchored to both the vehicle and molding, the other of said spring mechanisms being positioned between said one spring mechanism and the bumper end portion, said other of said spring mechanisms being fixedly anchored to one of the vehicle and molding and slidably anchored to the other of the vehicle and molding.

2. The structure of claim 1, further characterized in that the other of said spring mechanisms is fixedly anchored to the vehicle and slidably anchored to the molding.

3. The structure of claim 2, further characterized in the provision of a carriage, said carriage being slidably mounted in the molding, the other of said spring mechanisms being attached to said carriage.

4. The structure of claim 1, further characterized in that the other of said spring mechanisms comprises a flat spring member.

5. The structure of claim 1, further characterized in that said one spring mechanism comprises a substantially U-shaped flat spring member having one free end fixedly anchored to the vehicle and the other free end fixedly anchored to the molding.

* * * * *